(12) United States Patent
Jin et al.

(10) Patent No.: US 11,644,856 B2
(45) Date of Patent: *May 9, 2023

(54) ENERGY CONSUMPTION ASSESSMENT

(71) Applicant: INTERNATIONAL BUSINESS MACHINES CORPORATION, Armonk, NY (US)

(72) Inventors: Feng Jin, Shanghai (CN); Bin Li, Suzhou (CN); Xin Jie Lv, Beijing (CN); Qi Ming Tian, Beijing (CN); Lei Ye, Beijing (CN); Li Zhang, Beijing (CN); Gang Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 518 days.

This patent is subject to a terminal disclaimer.

(21) Appl. No.: 16/527,477

(22) Filed: Jul. 31, 2019

(65) Prior Publication Data

US 2019/0354128 A1 Nov. 21, 2019

Related U.S. Application Data

(63) Continuation of application No. 14/836,468, filed on Aug. 26, 2015, now Pat. No. 10,394,266.

(51) Int. Cl.
*G05F 1/66* (2006.01)

(52) U.S. Cl.
CPC ........ *G05F 1/66* (2013.01); *G05B 2219/2639* (2013.01)

(58) Field of Classification Search
CPC .............. G05B 23/0297; G05B 13/021; G05B 13/0265; G06N 20/00; G06F 11/00;

(Continued)

(56) References Cited

U.S. PATENT DOCUMENTS

| 8,995,249 B1 | 3/2015 | Roy et al. |
| 2003/0061091 A1 | 3/2003 | Amaratunga et al. |

(Continued)

FOREIGN PATENT DOCUMENTS

| CN | 103544394 A | 1/2014 |
| WO | 2004029557 A1 | 4/2004 |

OTHER PUBLICATIONS

'Energy-Aware Autonomic Resource Allocation in Multitier Virtualized Environments': Ardagna, IEEE Transactions on Services Computing, vol. 5, No. 1, Jan.-Mar. 2012.*

(Continued)

*Primary Examiner* — Li B. Zhen
*Assistant Examiner* — Peter D Coughlan
(74) *Attorney, Agent, or Firm* — Steven M. Bouknight

(57) ABSTRACT

A method, computer system, and a computer program product for assessing energy consumption is provided. The present invention may include determining a first set of critical energy consumption units (ECUs) involved in a target production process, the pool of the critical ECUs being obtained based on a plurality of reference production processes. The present invention may then include determining a second set of critical ECUs involved in the candidate production process. The present invention may also include determining a first set of non-critical ECUs involved in the target production process, the pool of the non-critical ECUs being obtained based on the plurality of reference production processes. The present invention may then include determining, a second set of non-critical ECUs involved in the candidate production process. The present invention may further include determining the process similarity.

17 Claims, 4 Drawing Sheets

(58) Field of Classification Search
CPC .. G06F 11/3006; G06F 11/3055; G06F 8/658; G06F 11/079; G01R 31/42; H02J 13/00; H02J 13/0017; G01B 2210/58; B60W 50/10; B60W 40/02; G05F 1/66
See application file for complete search history.

(56) References Cited

U.S. PATENT DOCUMENTS

| | | | |
|---|---|---|---|
| 2009/0216910 | A1 | 8/2009 | Duchesneau |
| 2013/0191188 | A1 | 7/2013 | Mathur et al. |
| 2013/0275991 | A1 | 10/2013 | Boegard et al. |
| 2014/0095415 | A1* | 4/2014 | Yu .................... G06N 20/00 706/12 |
| 2014/0222232 | A1 | 8/2014 | Kamel et al. |
| 2014/0277769 | A1* | 9/2014 | Matsuoka .......... G05B 13/0265 700/278 |
| 2017/0060159 | A1 | 3/2017 | Jin et al. |

OTHER PUBLICATIONS

'Maximizing Server Utilization while Meeting Critical SLAs via Weight-Based Collocation Management' Blagodurov, 978-3-901882-50-0c 2013 IFIP.*

Boyd et al., "The Evolution of the Energy Star® Energy Performance Indicator for Benchmarking Industrial Plant Manufacturing Energy Use," Journal of Cleaner Production, Apr. 2008, p. 709-715, vol. 16, Issue 6, Elsevier Ltd., Abstract Only Provided, http://www.sciencedirect.com/science/article/pii/S0959652607000601, Accessed on Aug. 17, 2015.

Hu et al., "Research on Design of Overalls Energy Efficiency Assessment System for High Energy Consumption Enterprises," Computer Engineering and Design, 2009, p. 1-2, vol. 17, CNKI, Abstract Only Provided, http://en.cnki.com.cn/Article_en/CJFDTOTAL-SJSJ200917050.htm, Accessed on Aug. 17, 2015.

Ma et al., "Enterprise Energy Consumption Process Simulation Method for Energy Efficiency Evaluation," Computer Integrated Manufacturing Systems, 2008, p. 1-2, vol. 12, CNKI, Abstract Only Provided, http://en.cnki.com.cn/Article_en/CJFDTotal-JSJJ200812014.htm, Accessed on Aug. 17, 2015.

Unido, "Global Industrial Energy Efficiency Benchmarking," An Energy Policy Tool Working Paper, Nov. 2010, p. 1-58, United Nations Industrial Development Organization.

IBM: List of IBM Patents or Patent Applications Treated as Related (Appendix P), Jul. 31, 2019, pp. 1-2.

Stark, "Introduction to Numerical Methods", 1970, Macmillan Publishing Co., Inc., New York, Collier Macmillan Publishers, London, 341 pages.

Ardagna, "Energy-Aware Autonomic Resource Allocation in Multitier Virtualized Environments", IEEE Transactions on Services Computing, vol. 5, No. 1, Jan.-Mar. 2012, pp. 2-19.

* cited by examiner

ENERGY CONSUMPTION ASSESSMENT

BACKGROUND

Energy has been increasingly consumed in various industrial production processes all over the world. The industrial energy consumption has already become a key problem of restricting economic and social development in many countries/regions. One of the foundations for the energy saving target is the assessment of the energy consumption or efficiency of enterprises. Such assessment is usually made on the basis of energy consumption units (ECUs). As used in the context of this disclosure, an ECU refers to a device, equipment, an infrastructure and/or a stage in the production process that consumes energy such as coal, water, electricity, gas, or the like. For instance, the ECUs in the glass production process include, but are not limited to, raw material mixing, melting furnace, glass forming, annealing, packing, and the like.

The accuracy of energy consumption assessment is affected by many factors. For example, different enterprises or organizations often adopt different production processes even for the same product. Moreover, for each ECU, there are usually many factors that have influence on the ECU's energy consumption. For example, different ratios of sulfur in the coal fines fed into the mills will cause different energy consumption. As a result, it is infeasible to apply a single procedure to different production processes to obtain accurate assessment of the energy consumption or efficiency.

SUMMARY

In general, example embodiments of the present invention include a method, device and computer program product for energy consumption assessment.

In an aspect, embodiments of the present invention provide a computer-implemented method. A process similarity between a target production process and a candidate production process is determined based on ECUs involved in the target production process and the candidate production process. In response to the process similarity being greater than a first threshold, an energy consumption similarity between the target production process and the candidate production process is determined based on a factor that has influence on energy consumption of at least one of the ECUs. In response to the energy consumption similarity being greater than a second threshold, the candidate production process is identified as a benchmark for assessing energy consumption of the target production process.

In another aspect, embodiments of the present invention provide a device. The device includes a first similarity determining module configured to determine a process similarity between a target production process and a candidate production process based on ECUs involved in the target production process and the candidate production process. The device further includes a second similarity determining module configured to determine, in response to the process similarity being greater than a first threshold, an energy consumption similarity between the target production process and the candidate production process based on a factor that has influence on energy consumption of at least one of the ECUs. A benchmark identifying module included in the device is configured to identify, in response to the energy consumption similarity being greater than a second threshold, the candidate production process as a benchmark for assessing energy consumption of the target production process.

In yet another aspect, embodiments of the present invention provide a computer program product that is tangibly stored on a non-transient machine-readable medium. The instructions, when executed on a device, cause the device to determine a process similarity between a target production process and a candidate production process based on ECUs involved in the target production process and the candidate production process. The instructions further cause the device to determine, in response to the process similarity being greater than a first threshold, an energy consumption similarity between the target production process and the candidate production process based on a factor that has influence on energy consumption of at least one of the ECUs. In response to the energy consumption similarity being greater than a second threshold, the candidate production process is identified as a benchmark for assessing energy consumption of the target production process.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
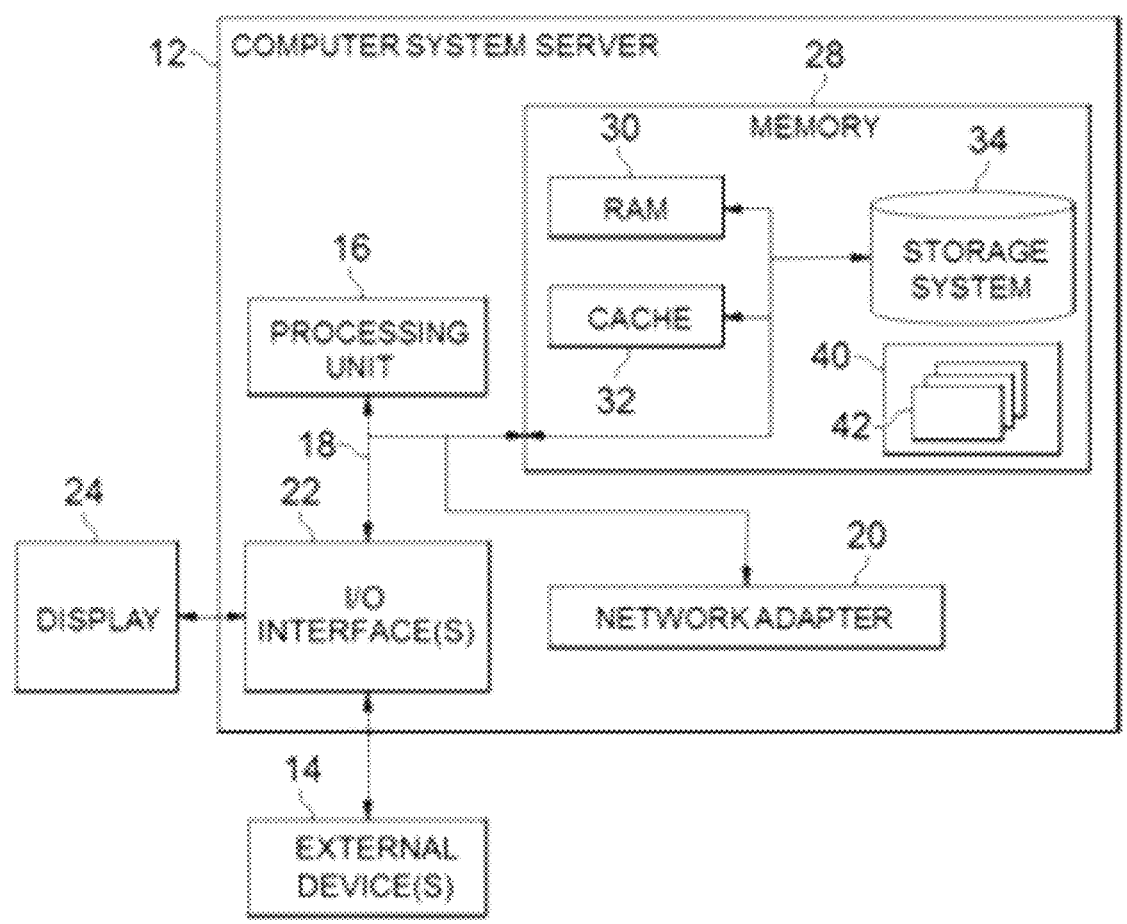
FIG. 1 is a block diagram of an electronic device in which embodiments of the present invention can be implemented.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Now some example embodiments of the present invention will be described. In accordance with embodiments of the present invention, given a target production process or enterprise whose energy consumption or efficiency is to be assessed, one or more similar production processes or enterprises are identified to serve as benchmarks. The consumption benchmarking activities can then be performed based on the identified benchmarks. For example, similar assessment procedure that has been applied to the benchmarks can be used to assess the energy consumption of the target production process or enterprise.

In general, the identification of a benchmark(s) is done in a two-stage procedure. First, the process similarity between the target production process and one or more candidate production processes are determined. This is, it is determined whether one or more candidate production processes have similar ECUs to those of the target production process. If the process similarity between the target production process and a candidate production process is high enough, then in the second stage, the energy consumption similarity between the target production process and that candidate production processes is determined on the basis of one or more involved ECUs. For each ECU, the contributions of one or more influence factors to the energy consumption are used to determine the energy consumption similarity. If the energy consumption similarity between the target production process and a candidate production process is high enough, that candidate production process is identified as a benchmark which can be used in the assessment of the energy consumption of the target production process.

In the following paragraphs, example embodiments will be described with reference to the identification of benchmark production processes. It is to be understood that the idea of the present invention also applies to the identification of benchmark enterprises. For example, in some embodiments, the similarity between two enterprises may be determined based on the energy consumption similarity between one or more production processes thereof.

Figure 2:
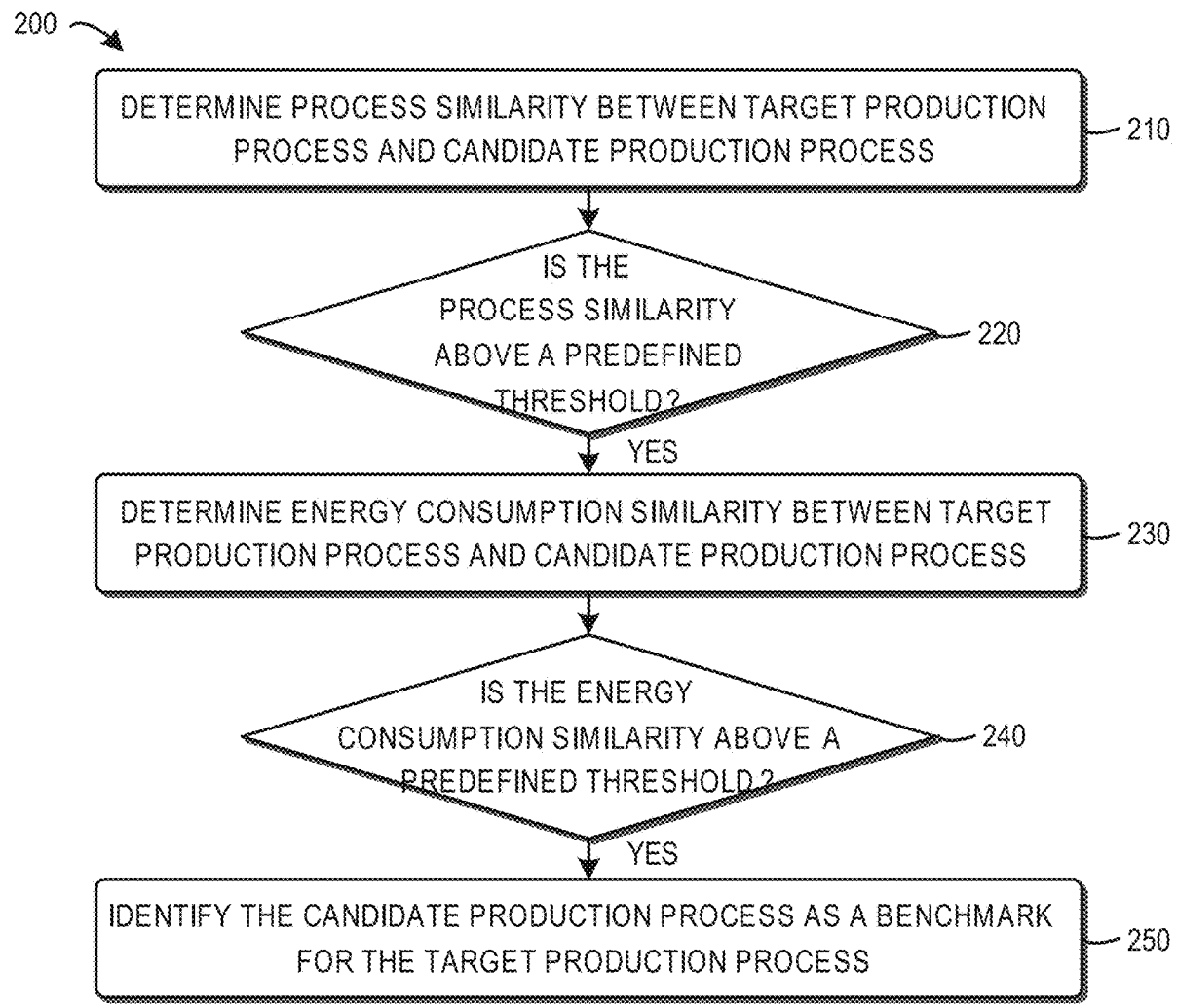
FIG. 2 is a flowchart of a method for identifying a benchmark for a target production process for energy consumption assessment in accordance with embodiments of the present invention.

FIG. 2 shows a flowchart of a method 200 for identifying a benchmark for a target production process in accordance with embodiments of the present invention. In the context of this disclosure, the target production process refers to a production process for a certain product whose energy consumption or efficiency is to be assessed. The target production process may involve a plurality of ECUs. An ECU may represent a device, equipment, infrastructure, and/or stages in the target production process. By way of example, it is supposed that target production process is an industrial process for producing cement. The ECUs involved in the target production process may comprise, for example, quarrying and mining of materials, preparation of initial fuels, preparation of additives, drying of additives, clinkering, grinding, and the like.

The method 200 is to determine whether a candidate production process is similar enough to the target production process in terms of energy consumption or efficiency. If so, the candidate production process can be identified as a benchmark for assessing energy consumption of the target production process. Generally speaking, the candidate production process and the target production process are production processes implemented by different enterprises for producing the same or similar product(s). Like the target production process, the candidate production process also involves a plurality of ECUs.

In the following description, only for the purpose of illustration, example embodiments will be discussed with reference to one candidate production process. It is to be understood, however, that there may be multiple candidate production processes and the method 200 as described herein can be applied to determine the similarity between the target production process and each of the candidate production processes.

As shown, the method 200 is entered in step 210, where the process similarity between a target production process and a candidate production process is determined based on the ECUs involved in the target and candidate production processes. It would be appreciated that different enterprises may adopt different production processes to produce the same or similar product. For the example, the production processes may have different numbers of processing stages, work flows, processing orders, and so forth. In step 210, it is determined whether the candidate production process is similar to the target production process in terms of the production flow. If not, the candidate production process will be filtered out.

In some embodiments, in step 210, the process similarity may be determined based on the critical ECUs in the target production process and the candidate production process. In any given production process, some ECUs are essential and indispensable, while the others are relatively less important and thus can be omitted in some cases. In determining the process similarity, the candidate production process is not necessarily required to be completely and exactly the same as the target production process. Instead, if the candidate production process and the target production process are substantially identical to each other in terms of the critical ECUs, the process similarity between these two processes may be set higher. By only taking the critical ECUs into consideration, the noise caused by the less important nodes can be eliminated.

In one embodiment, for each kind of production processes, there is a pool of critical ECUs. For example, for the glass production, the pool contains one or more ECUs that are essential to all the glass production processes. The pool of critical ECUs may be obtained in any suitable ways. For example, in one embodiment, one or more critical ECUs may be designated by the industry association, industry standard, and the like. Alternatively, or in addition, one or more critical ECUs may be automatically identified, for example, based on the topology of the production processes implemented by different enterprises.

More specifically, given a product, a plurality of production processes may be collected as reference production processes. These reference production processes may be implemented by different enterprises, for example. The topology of each reference production process indicates the ECUs and their relationship in the production process. For example, in one embodiment, the topology may be considered as a directed graph. The nodes in the graph represent the involved ECUs and the edges represent the work flows. If taking an ECU off will cause the topology of each reference production process to be broken, then the ECU is identified as a critical ECU.

Figure 3:
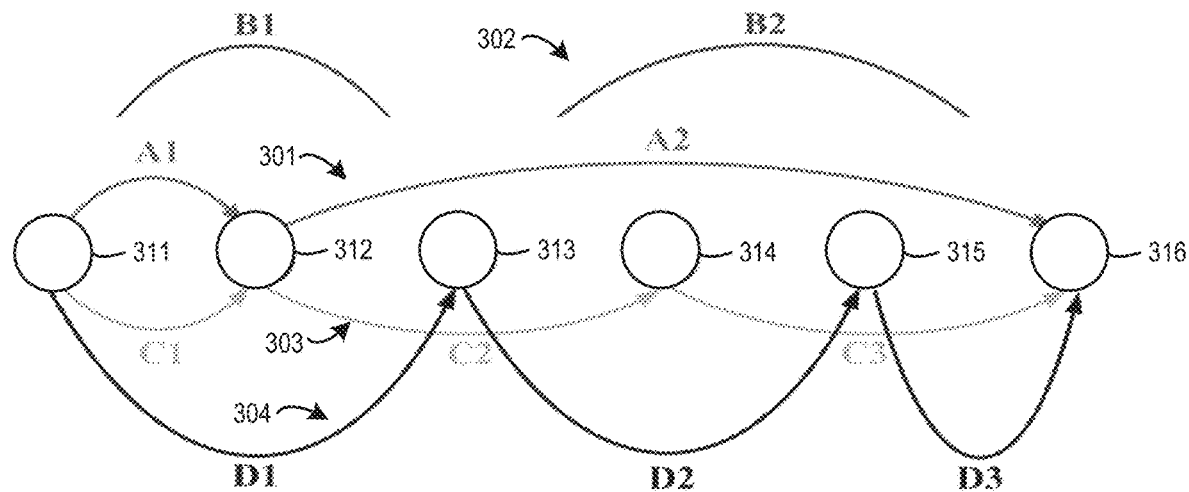
FIG. 3 is a schematic diagram of the identification of critical ECUs in accordance with embodiments of the present invention.

FIG. 3 shows an example of identifying critical ECUs. In this example, there are four reference production processes. The reference production process 301 includes stages A1 and A2 and involves ECUs 311, 312 and 316. The reference production process 302 includes stages B1 and B2 and involves ECUs 311, 313 and 316. The reference production process 303 includes stages C1, C2, and C3 and involves ECUs 311, 312, 314 and 316. The reference production process 304 includes stages D1, D2, and D3 and involves ECUs 311, 313, 315 and 316.

In this example, if the ECU 311 is removed, then the topologies of the reference production processes 301, 302, 303, and 304 would all be broken. Therefore, the ECU 311 is identified as a critical ECU. If the ECU 313 is taken off, the topology of the reference production processes 302 and 304 would be broken while the reference production processes 301 and 303 would remain intact. Therefore, the ECU 313 is identified as a non-critical ECU. In this way, the ECUs 311 and 316 are identified as critical ECUs, and the other ECUs are non-critical ECUs. It is to be understood that though only the initial and final ECUs 311 and 316 are identified as critical ECUs, the scope of the invention is not limited thereto. In other cases, one or more intermediate ECUs may act as critical ECUs.

Figure 4:
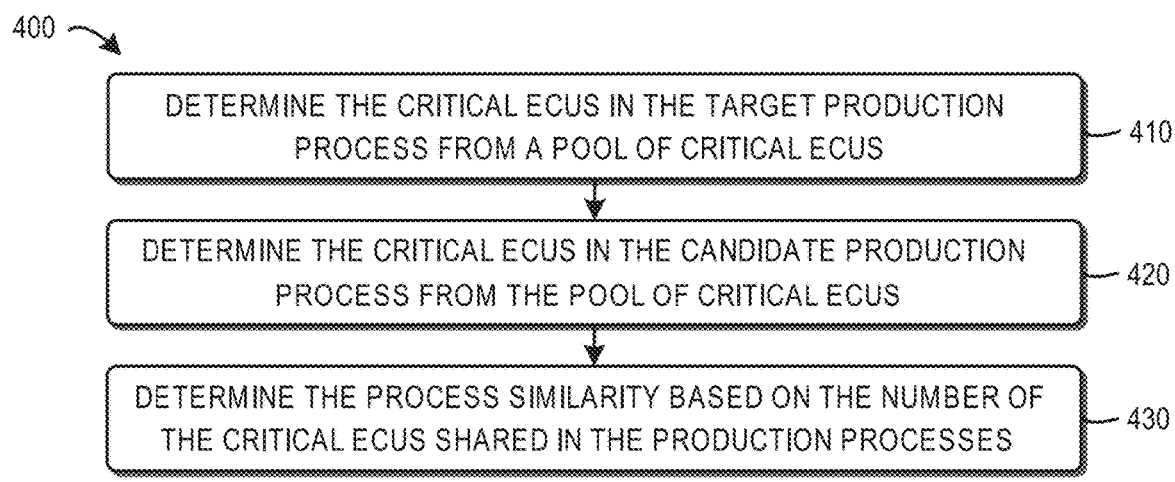
FIG. 4 is a flowchart of a method for determining the process similarity based on the critical ECUs in accordance with embodiments of the present invention.

FIG. 4 shows a flowchart of a method 400 for determining the process similarity based on the critical ECUs. The method 400 can be considered as an implementation of step 210 in the method 200. As shown, in step 410, the critical ECUs in the target production process is determined from the pool of critical ECUs. That is, it is determined which ECUs involved in the target production process are critical ECUs as included in the pool of critical ECUs. For the sake of discussion, the set of critical ECUs in the target production process is referred to as the first set of critical ECUs. In step 420, the critical ECUs in the candidate production process is determined from the pool of critical ECUs. This set of ECUs is referred to as the second set of critical ECUs.

Then in step 430, the process similarity may be determined based on the number of critical ECUs shared in the first and second sets of critical ECUs. In some embodiments, in step 430, the similarity of critical ECUs may be calculated based on the number of the shared critical ECUs and the scale of the second set of critical ECUs in the candidate production process. More particularly, the similarity k may be calculated by dividing the number of shared critical ECUs by the size of the second set of critical ECUs, as follows:

$$k = x/y$$

where x represents the number of ECUs shared by the first and second sets, and y represents the total number of ECUs in the second set. This is merely for the purpose of illustration without suggesting any limitation as to the scope of the invention. Given the number of critical ECUs shared by the target and candidate production processes, the similarity of critical ECUs may be quantized in any other suitable ways.

Referring back to step 210 of the method 200 as shown in FIG. 2, in some embodiments, the process similarity may be determined entirely based on the critical ECUs. For example, the similarity of critical ECUs between the target production process and the candidate production process as determined in step 430 of the method 400 may be directly used as the process similarity. Alternatively, in other embodiments, the non-critical ECUs may be taken into account as well. For example, in one embodiment, the similarity of non-critical ECUs between the target production process and the candidate production process may be calculated and combined with the similarity of critical ECUs in a weighted manner, where the similarity of critical ECUs has higher weight.

The similarity of non-critical ECUs may be determined in a variety of ways. For example, in some embodiments, the similarity of non-critical ECUs may be calculated based on the number of non-critical ECUs shared by the target production process and the candidate production process, which is similar to step 430 of the method 400 as described above. Alternatively, in some other embodiments, the similarity of non-critical ECUs may be determined using a piecewise function. More specifically, it is found that the accuracy of the process similarity drops with the increase of the number of non-critical ECUs. When the number of non-critical ECUs exceeds a predefined threshold, the non-critical ECUs would have little effect on the process similarity. Accordingly, in some embodiments, if the number of the non-critical ECUs in the target production process and the candidate production process is below the threshold, the similarity of non-critical ECUs calculated according to a decreasing function of the number of non-critical ECUs. If the number of non-critical ECUs in the target production process or candidate production process exceeds the threshold, then the similarity of non-critical ECUs is set to a constant low value, for example, zero.

Figure 5:
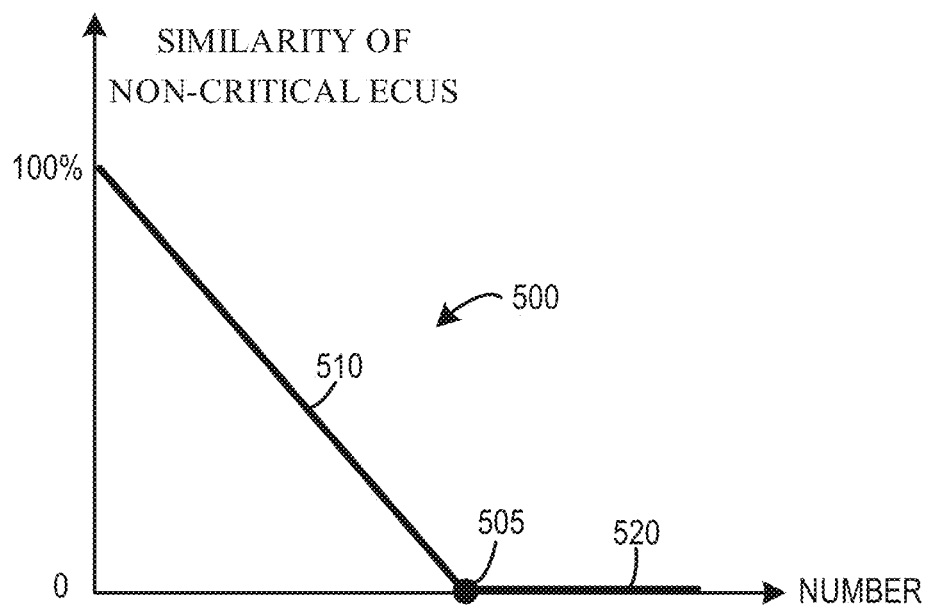
FIG. 5 is a schematic diagram of a function used to determine the similarity of non-critical ECUs between the target production process and the candidate production process in accordance with embodiments of the present invention.

FIG. 5 shows a schematic diagram of a function used to determine the similarity of non-critical ECUs between the target production process and the candidate production process. As shown, the function 500 is a piecewise function and contains a decreasing part 510 below the threshold 505 and a constant part 520 above the threshold 505. In this example, the decreasing part 510 is a linear function, and the value of the part 520 is zero. It is to be understood that the scope of the invention is not limited to the example shown in FIG. 5. In other embodiments, another type of decreasing function may serve as the part 510 below the threshold 505. Alternatively, or in addition, a non-zero constant value may be used above the threshold 505.

Still with reference to FIG. 2, the method 200 proceeds to step 220 to check whether the process similarity between the target production process and the candidate production process is above a predefined threshold. If not, the production flow of the target production process is determined to be substantially different from that of the target production process. In this event, the target production process cannot serve as a benchmark for the target production process and thus will be excluded from the subsequent stage.

On the other hand, if it is determined in step 220 that the process similarity between the target production process and the candidate production process is above the predefined threshold, the method 200 proceeds to step 230 to determining an energy consumption similarity between the target production process and the candidate production process. In accordance with embodiments of the present invention, the energy consumption similarity is determined at least in part based on one or more factors that have influence on the energy consumption of one or more ECUs involved in the target production process and the candidate production process. In the following discussion, such a factor is referred to as an "influence factor."

As discussed above, the target production process and the candidate production process are similar to one another in terms of the topology of ECUs. It means that the target production process and the candidate production process share the same or corresponding ECUs. For each of these ECUs, there may be one or more influence factors that have impact on the energy consumption or efficiency. In general, the influence factors include the design variables and operational variables for the associated ECU. For instance, examples of the design variables associated with the melting furnace in glass production process include, but are not limited to, type of glass (glass composition), glass furnace capacity, melting area, length to width ratio, height of combustion chamber, and the like. Examples the associated operational variables include, but are not limited to, glass draw, cullet percentage, moisture in raw material, oxygen at furnace outlet, oxygen at regenerator outlet, furnace pressure, and the like.

For any given ECU, the values of one or more influence factors in the target production process can be obtained. For example, these values may be measured or otherwise determined or indicated in the specification or manual. The values of those influence factors associated with the same or corresponding ECUs in the candidate production process are also determined. The energy consumption similarity between the ECU may be then determined based on these two sets of values of the influence factors.

In some embodiments, the values of the influence factors in the target production process are considered as elements of a vector. Likewise, the values of the influence factors in the candidate production process are also considered as elements of a vector. These vectors can be referred to as "influence factor vector." The distance between the influence factor vectors associated with the target production process and the candidate production process may be calculated as a metric of the energy consumption similarity.

It is supposed that the influence factors associated with an ECU include $X_1, X_2, \ldots, X_n$ and that the values of the influence factors in the target production process and the candidate production process are $\{x_{11}, x_{12}, \ldots, x_{1n}\}$ and $\{x_{21}, x_{22}, \ldots, x_{2n}\}$, respectively. Then the distance between the influence factor vectors may be calculated as follows:

$$D=(x_{11}-x_{21})^2+(x_{12}-x_{22})^2+ \ldots +(x_{1n}-x_{2n})^2$$

In this way, the energy consumption similarity between the target production process and the candidate production process is determined by comparing the influence factor vectors.

It would be appreciated that different influence factors may have different degrees of impact on the energy consumption or efficiency. Accordingly, in some embodiments, the influence factors may be weighted in determining the energy consumption similarity between the target production process and the candidate production process. In such embodiments, the distance between the influence vectors may be calculated as follows:

$$D = \alpha_1(x_{11}-x_{21})^2 + \alpha_2(x_{12} \times x_{22})^2 + \ldots + \alpha_n(x_{1n}-x_{2n})^2$$

where $\alpha_1, \alpha_2 \ldots \alpha_n$ represent the weights for the influence factors. Each weight represents the contribution of the respective influence factor to the energy consumption.

In one embodiment, the weights may be determined in advance, for example, according to the user experience, statistics, and/or any other relevant factors. Alternatively, or in addition, the weights may be dynamically determined according to the nature of the target production process being considered. For example, in one embodiment, the weights may be determined based on the segmentation of the sample data from a plurality of reference production processes.

In such embodiments, for each influence factor, its values in the plurality of reference production processes may be measured or otherwise obtained. Then the reference production processes may be divided into a plurality of segments according to the values of the influence factor. Considering the ratio of sulfur contained in the coal as an example, the plurality of reference production processes may be divided into five segments according the ratio of sulfur. For example, the segments may be as follows:

TABLE 1

| Segments | Ratio of Sulfur in Coal |
|---|---|
| 1 | [0, 20%] |
| 2 | (20%, 40%] |
| 3 | (40%, 60%] |
| 4 | (60%, 80%] |
| 5 | (80%, 60%] |

It should be appreciated that the example shown in Table 1 is given merely for the purpose of illustration. The segmentation may be performed in any other suitable ways. For example, the reference production processes may be divided into any suitable number of segments, and sizes of the segments are not necessarily equal to one another.

Then the weight of the influence factor can be determined based on the segmentation. In one embodiment, it is possible to obtain the reference metrics of the energy consumption related to the influence factor in the reference production processes. For example, each reference metric of the energy consumption may be the energy consumption per unit. Then the average of the reference metrics of the energy consumption may be calculated. For the sake of discussion, this average is referred to the first average denoted as E.

The segment to which the target production process belongs may be determined from among the plurality of segments resulted from the segmentation. For instance, in the above example discussed with reference to Table 1, if the ratio of sulfur in coal fed to the ECU is 42% in the target production process, then the target production process belongs to Segment 3. Then it is calculated the average of the reference metrics of energy consumption related to the influence factor in the reference production processes that belong to the determined segment. For the sake of discussion, this average is referred to the second average denoted as $E_k$.

Based on the first and second averages, the deviation of the reference metrics of the energy consumption among the plurality of segments may be calculated, for example, as follows:

$$s = \sqrt{\frac{\sum_{k=1}^{K}(E_k - \overline{E})^2}{K-1}}$$

where K represents the number of the segments.

In one embodiment, the weight $\alpha$ for the j-th influence factor may be calculated as follows:

$$\alpha_j = \frac{E_k - \overline{E}}{s}$$

In this way, the weights for the influence factors may be adaptively determined in association with the specific target production process or enterprise. That is, different target production processes or enterprises calculate the weights for the influence factors at different segments. As such, the accuracy of the contributions of the influence factors can be significantly improved.

The method 200 proceeds to step 240 to check whether the energy consumption similarity as determined in step 230 is greater than a predefined threshold. If so, in step 240, the candidate production process is identified as a benchmark for the target production process which can be used in the assessment of energy consumption of the target production process. With the method 200, one or more production processes that are similar to the target production process can be identified. By using these production processes as benchmarks, the energy consumption or efficiency of the target production process may be assessed more accurately. Likewise, benchmark enterprises can be identified to assess the consumption or efficiency of the target enterprise.

Figure 6:
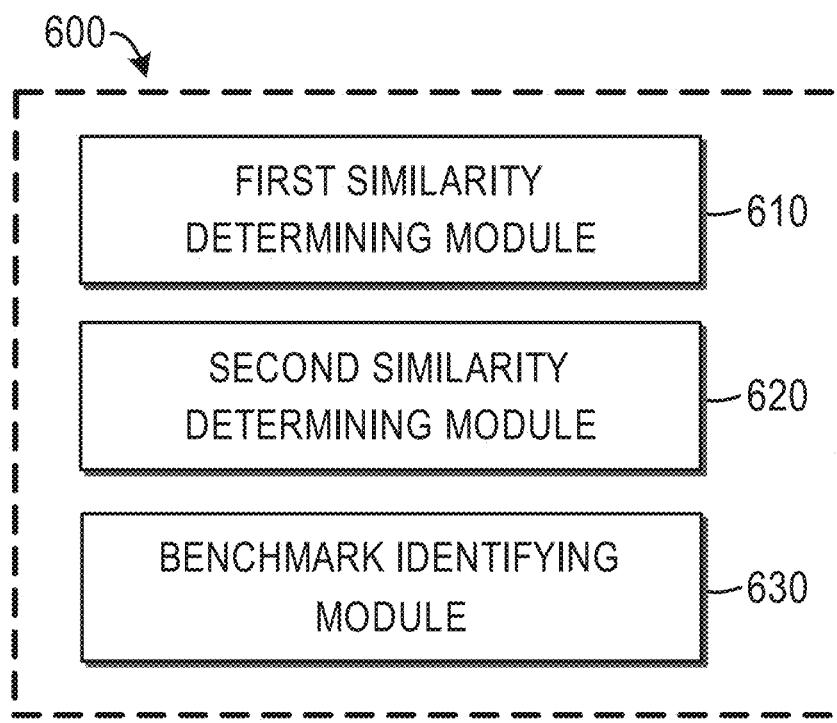
FIG. 6 is a block diagram of a device for use in energy consumption assessment in accordance with embodiments of the present invention.

FIG. 6 is a block diagram of a system 600 that can be used in energy consumption assessment in accordance with embodiments of the present invention. In some embodiments, the system 600 may be implemented as a computer program that is stored in memory 28 and executed by processing unit 16 of computer system 12 as shown in FIG. 1, for example. In other embodiments, one or more components in the system 600 can be implemented by hardware such as integrated circuit (IC) chips, application-specific integrated circuits (ASICs), system-on-chip (SOC), field programmable gate arrays (FPGAs), or the like.

As shown, system 600 comprises a first similarity determining module 610 configured to determine a process similarity between a target production process and a candidate production process based on energy consumption units (ECUs) involved in the target production process and the candidate production process; a second similarity determining module 620 configured to determine, in response to the process similarity being greater than a first threshold, an energy consumption similarity between the target production process and the candidate production process based on a factor that has influence on energy consumption of at least one of the ECUs; and a benchmark identifying module 630 configured to identify, in response to the energy consumption similarity being greater than a second threshold, the candidate production process as a benchmark for assessing energy consumption of the target production process.

In some embodiments, the first similarity determining module 610 is configured to determine, from a pool of critical ECUs, a first set of critical ECUs involved in the target production process, the pool of the critical ECUs being obtained based on a plurality of reference production processes; determine, from the pool of critical ECUs, a second set of critical ECUs involved in the candidate production process; and determine the process similarity based on the number of critical ECUs shared in the first and second sets of critical ECUs.

In some embodiments, the system 600 further comprises a pool obtaining module configured to: determine a topology for each of the plurality of reference production processes; identify an ECU as a critical ECU if the topology for each of the plurality of reference production processes is broken without the ECU; and add the identified critical ECU into the pool of critical ECUs.

In some embodiments, the second similarity determining module 620 is configured to obtain a first value of the influence factor in the target production process; obtain a second value of the influence factor in the candidate production process; determine a weight for the influence factor in association with the target production process; and determine the energy consumption similarity by comparing the first value and the second value based on the determined weight.

In some embodiments, the second similarity determining module 620 is configured to determine reference values of the influence factor in a plurality of reference production processes; divide the plurality of reference production processes into a plurality of segments according to the reference values of the influence factor; and determine the weight based on the dividing of the plurality of reference production processes.

In some embodiments, the second similarity determining module 620 is configured to obtain reference metrics of energy consumption related to the factor in the plurality of reference production processes; calculate a first average of the reference metrics; determine one of the segments to which the target production process belongs; calculate a second average of the reference metrics in the determined segment; calculate a deviation of the reference metrics among the plurality of segments; and determine the weight based on the first average, the second average and the deviation.

In some embodiments, the influence factor includes at least one of: a design variable associated with the least one of the ECUs; or an operational variable associated with the at least one of the ECUs.

For the sake of clarity, FIG. 6 does not show optional modules included in the system 600. It is to be understood that all features as described above with reference to FIG. 1 to FIG. 5 apply to the system 600. Moreover, partitioning of modules in the system 600 is merely for the purpose of illustration without suggesting any limitation as to the scope of the present invention. It is also to be understood that the modules included in the system 600 may be implemented by various manners, including software, hardware, firmware or any combination thereof, as described above.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, from a first pool of critical energy consumption units (ECUs), a first set of critical ECUs involved in a target production process, the first pool of the critical ECUs being obtained based on a plurality of reference production processes, wherein obtaining the first pool of critical ECUs comprises:
   creating, by utilizing a computing device, a topology for each of the plurality of reference production processes, and
   identifying an ECU as a critical ECU in response to determining that the topology for each of the plurality of reference production processes is broken without the ECU;
   determining, from a second pool of critical ECUs, a second set of critical ECUs involved in a candidate production process, wherein the target production process and the candidate production process are separate processes;
   determining, from a first pool of non-critical ECUs, a first set of non-critical ECUs involved in the target production process, the first pool of the non-critical ECUs being obtained based on the plurality of reference production processes;
   determining, from a second pool of non-critical ECUs, a second set of non-critical ECUs involved in the candidate production process; and
   determining a process similarity between the target production process and the candidate production process based on comparing the number of critical ECUs similarly shared in the first and second sets of critical ECUs and the number of non-critical ECUs similarly shared in the first and second sets of non-critical ECUs, wherein the number of critical ECUs similarly shared between the target production process and the candidate production process are weighted higher relative to the number of non-critical ECUs similarly shared when determining the process similarity between the target production process and the candidate production process; and
   based on results from the process similarity and an energy consumption similarity exceeding certain thresholds, identifying the candidate process as a benchmark for assessing energy consumption of the target production process.

2. The method of claim 1, further comprising:
   in response to the process similarity being greater than a first threshold, correlating the energy consumption similarity between the target production process and the candidate production process based on a factor that has influence on energy consumption of at least one of the ECUs; and
   in response to the energy consumption similarity being greater than a second threshold, identifying, by utilizing a benchmark identifying module in the computing device, the candidate production process as the benchmark for assessing energy consumption of the target production process.

3. The method of claim 2 wherein determining the energy consumption similarity, comprises:
   obtaining a first value of the factor in the target production process;
   obtaining a second value of the factor in the candidate production process;
   determining a weight for the factor in association with the target production process; and
   determining the energy consumption similarity by comparing the first value and the second value based on the determined weight.

4. The method of claim 3, wherein determining the weight for the factor in association with the target production process, comprises:

determining reference values of the factor in a plurality of reference production processes;

dividing the plurality of reference production processes into a plurality of segments according to the reference values of the factor; and determining the weight based on the dividing of the plurality of reference production processes.

5. The method of claim 4, wherein determining the weight based on the dividing of the plurality of reference production processes, comprises:

obtaining reference metrics of energy consumption related to the factor in the plurality of reference production processes;

calculating a first average of the reference metrics;

determining one of the segments to which the target production process belongs;

calculating a second average of the reference metrics in the determined segment;

calculating a deviation of the reference metrics among the plurality of segments; and determining the weight based on the first average, the second average and the deviation.

6. The method of claim 2, wherein the factor includes at least one of:

a design variable associated with the least one of the ECUs; and an operational variable associated with the at least one of the ECUs.

7. A computer system for assessing energy consumption, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

determining, from a first pool of critical energy consumption units (ECUs), a first set of critical ECUs involved in a target production process, the first pool of the critical ECUs being obtained based on a plurality of reference production processes, wherein obtaining the first pool of critical ECUs comprises:

creating, by utilizing a computing device, a topology for each of the plurality of reference production processes, and identifying an ECU as a critical ECU in response to determining that the topology for each of the plurality of reference production processes is broken without the ECU;

determining, from a second pool of critical ECUs, a second set of critical ECUs involved in a candidate production process, wherein the target production process and the candidate production process are separate processes;

determining, from a first pool of non-critical ECUs, a first set of non-critical ECUs involved in the target production process, the first pool of the non-critical ECUs being obtained based on the plurality of reference production processes;

determining, from a second pool of non-critical ECUs, a second set of non-critical ECUs involved in the candidate production process; and determining a process similarity between the target production process and the candidate production process based on comparing the number of critical ECUs similarly shared in the first and second sets of critical ECUs and the number of non-critical ECUs similarly shared in the first and second sets of non-critical ECUs, wherein the number of critical ECUs similarly shared between the target production process and the candidate production process are weighted higher relative to the number of non-critical ECUs similarly shared when determining the process similarity between the target production process and the candidate production process based on results from the process similarity and an energy consumption similarity exceeding certain thresholds, identifying the candidate process as a benchmark for assessing energy consumption of the target production process.

8. The computer system of claim 7, further comprising:

in response to the process similarity being greater than a first threshold, correlating the energy consumption similarity between the target production process and the candidate production process based on a factor that has influence on energy consumption of at least one of the ECUs; and in response to the energy consumption similarity being greater than a second threshold, identifying, by utilizing a benchmark identifying module in the computing device, the candidate production process as the benchmark for assessing energy consumption of the target production process.

9. The computer system of claim 8, wherein determining the energy consumption similarity, comprises:

obtaining a first value of the factor in the target production process;

obtaining a second value of the factor in the candidate production process;

determining a weight for the factor in association with the target production process; and determining the energy consumption similarity by comparing the first value and the second value based on the determined weight.

10. The computer system of claim 9, wherein determining the weight for the factor in association with the target production process, comprises:

determining reference values of the factor in a plurality of reference production processes;

dividing the plurality of reference production processes into a plurality of segments according to the reference values of the factor; and determining the weight based on the dividing of the plurality of reference production processes.

11. The computer system of claim 10, wherein determining the weight based on the dividing of the plurality of reference production processes, comprises:

obtaining reference metrics of energy consumption related to the factor in the plurality of reference production processes;

calculating a first average of the reference metrics;

determining one of the segments to which the target production process belongs;

calculating a second average of the reference metrics in the determined segment;

calculating a deviation of the reference metrics among the plurality of segments; and determining the weight based on the first average, the second average and the deviation.

12. The computer system of claim 8, wherein the factor includes at least one of:

a design variable associated with the least one of the ECUs; and an operational variable associated with the at least one of the ECUs.

13. A computer program product for assessing energy consumption, the computer program product comprising a computer readable storage medium having program instructions embodied therewith, the program instructions executable by processor to:
  determining, from a first pool of critical energy consumption units (ECUs), a first set of critical ECUs involved in a target production process, the first pool of the critical ECUs being obtained based on a plurality of reference production processes, wherein obtaining the first pool of critical ECUs comprises:
    creating, by utilizing a computing device, a topology for each of the plurality of reference production processes, and
    identifying an ECU as a critical ECU in response to determining that the topology for each of the plurality of reference production processes is broken without the ECU;
  determining, from a second pool of critical ECUs, a second set of critical ECUs involved in a candidate production process, wherein the target production process and the candidate production process are separate processes;
  determining, from a first pool of non-critical ECUs, a first set of non-critical ECUs involved in the target production process, the first pool of the non-critical ECUs being obtained based on the plurality of reference production processes;
  determining, from a second pool of non-critical ECUs, a second set of non-critical ECUs involved in the candidate production process; and
  determining a process similarity between the target production process and the candidate production process based on comparing the number of critical ECUs similarly shared in the first and second sets of critical ECUs and the number of non-critical ECUs similarly shared in the first and second sets of non-critical ECUs, wherein the number of critical ECUs similarly shared between the target production process and the candidate production process are weighted higher relative to the number of non-critical ECUs similarly shared when determining the process similarity between the target production process and the candidate production process
  based on results from the process similarity and an energy consumption similarity exceeding certain thresholds, identifying the candidate process as a benchmark for assessing energy consumption of the target production process.

14. The computer program product of claim 13, further comprising:
  in response to the process similarity being greater than a first threshold, correlating the energy consumption similarity between the target production process and the candidate production process based on a factor that has influence on energy consumption of at least one of the ECUs; and
  in response to the energy consumption similarity being greater than a second threshold, identifying, by utilizing a benchmark identifying module in the computing device, the candidate production process as the benchmark for assessing energy consumption of the target production process.

15. The computer program product of claim 14 wherein determining the energy consumption similarity, comprises:
  obtaining a first value of the factor in the target production process;
  obtaining a second value of the factor in the candidate production process;
  determining a weight for the factor in association with the target production process; and
  determining the energy consumption similarity by comparing the first value and the second value based on the determined weight.

16. The computer program product of claim 15, wherein determining the weight for the factor in association with the target production process, comprises:
  determining reference values of the factor in a plurality of reference production processes;
  dividing the plurality of reference production processes into a plurality of segments according to the reference values of the factor; and
  determining the weight based on the dividing of the plurality of reference production processes.

17. The computer program product of claim 16, wherein determining the weight based on the dividing of the plurality of reference production processes, comprises:
  obtaining reference metrics of energy consumption related to the factor in the plurality of reference production processes;
  calculating a first average of the reference metrics;
  determining one of the segments to which the target production process belongs;
  calculating a second average of the reference metrics in the determined segment;
  calculating a deviation of the reference metrics among the plurality of segments; and
  determining the weight based on the first average, the second average and the deviation.

* * * * *